United States Patent [19]
Tramposch

[11] 3,935,937
[45] Feb. 3, 1976

[54] PLASTIC AND METAL ARTICLE OF MANUFACTURE

[75] Inventor: Herbert Tramposch, Riverside, Conn.

[73] Assignee: Pitney-Bowes, Inc., Stamford, Conn.

[22] Filed: Sept. 12, 1974

[21] Appl. No.: 505,366

Related U.S. Application Data

[62] Division of Ser. No. 413,782, Nov. 8, 1973, Pat. No. 3,859,712.

[52] U.S. Cl. .................. 197/53; 101/368; 101/401; 197/36
[51] Int. Cl.² ........................................... B41J 1/32
[58] Field of Search ........... 101/111, 109, 398, 401, 101/401.2, 395, 368; 197/53, 36, 49

[56] References Cited
UNITED STATES PATENTS

| | | | |
|---|---|---|---|
| 804,938 | 11/1905 | Felbel | 197/36 |
| 895,652 | 8/1908 | Macis | 197/36 |
| 1,048,878 | 12/1912 | Ranney | 197/36 |
| 1,124,571 | 1/1915 | Woodward | 197/36 X |
| 1,379,432 | 5/1921 | Yeoell | 101/395 |
| 1,601,287 | 9/1926 | Bertinetti | 101/401 |
| 1,788,594 | 1/1931 | Robinson et al. | 101/401 |
| 1,831,645 | 11/1931 | Ballard | 101/401 |
| 2,009,331 | 7/1935 | Uher et al. | 101/401.1 |
| 2,084,685 | 6/1937 | Hogner | 101/401 |
| 2,098,780 | 11/1937 | Helmond | 197/36 |
| 2,972,938 | 2/1961 | Sausece | 101/398 X |
| 3,371,766 | 3/1968 | Staller | 197/53 |
| 3,442,365 | 5/1969 | Ragland, III et al. | 197/55 X |
| 3,643,774 | 2/1972 | Konpur, Jr. | 197/53 X |
| 3,773,161 | 11/1973 | Bossi | 197/49 |

OTHER PUBLICATIONS

'Supermastic Printer Type Characters', Piggin & Miller, IBM Tech. Disc. Bull., Vol. 14, No. 12, May 1972.

Primary Examiner—Edgar S. Burr
Assistant Examiner—Paul J. Hirsch
Attorney, Agent, or Firm—William D. Soltow, Jr.; Albert W. Scribner; Robert S. Salzman

[57] ABSTRACT

A composite of several materials constructed to form a printing disc, of the type used in high speed printers. The printing disc is manufactured in separate stages in order to achieve characteristics within the final assembly that are necessary for high speed quality printing. The assembled printing disc comprises a disc shaped member of flexible plastic. The hub of the disc has radially extending arms which each unite with a print head character composed of a thin layer of powdered metal or plastic zinc plated with a layer of metal.

1 Claim, 9 Drawing Figures

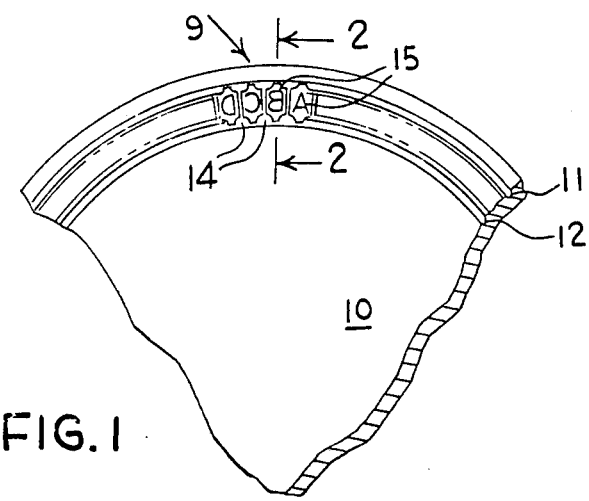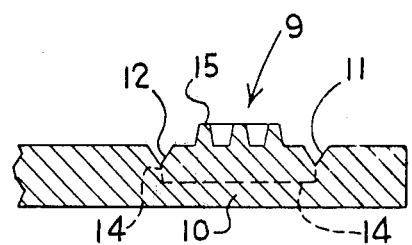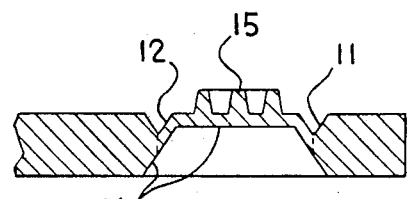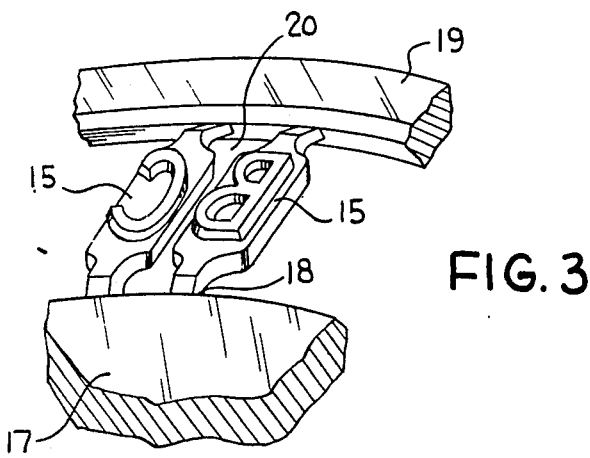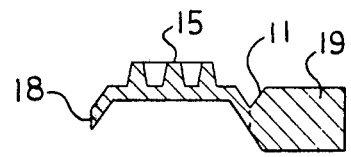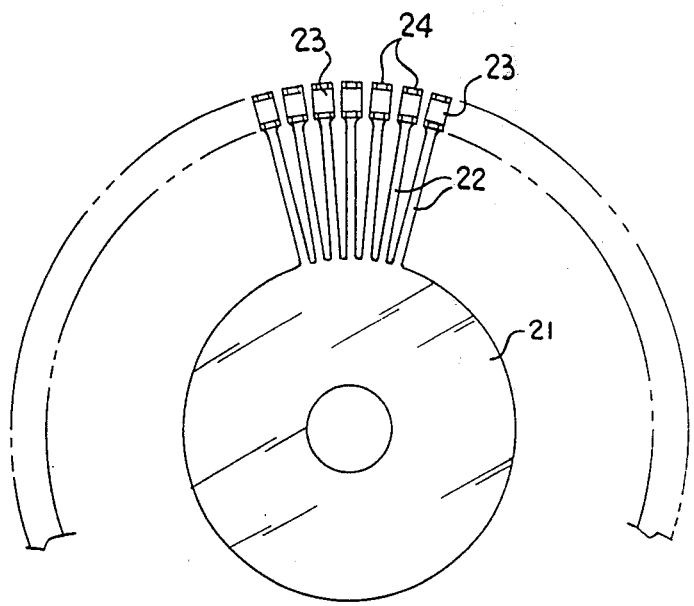

3,935,937

PLASTIC AND METAL ARTICLE OF MANUFACTURE

This is a division of application Ser. No. 413,782, filed Nov. 8, 1973, now U.S. Pat. No. 3,859,712.

This invention pertains to a method of manufacturing a printing disc, to the finished printing disc article, and more particularly to a composite printing disc assembly that obtains the necessary characteristics for high speed quality printing.

BACKGROUND OF THE INVENTION

In order to achieve a high speed printing disc, it is necessary to make the arms of the disc very flexible and light in weight so as to accommodate rapid printing impacts. Many flexible and light weighted plastics are available for this purpose. However, if a high quality of printing is also a requirement, then it is necessary to have the character face of each arm of the disc composed of a material that is hard and durable.

Because the material requirements for high speed printing and quality printing are diametrically opposite, a compromise was originally sought for the disc material.

Many tests, however proved that no adequate compromise could be made. Neither was it found possible to plate over the character surface of the arms without substantially destroying the crispness of the character image.

Furthermore, the method of electroforming a metallic cover upon the flexible plastic character head was not entirely satisfactory, because serious cracking developed in the metal after a relatively small number of impacts.

A pure metal print head attached to the plastic arm was not satisfactory. The metal print head had the necessary structural strength, but weighed too much for high speed printing.

The present inventive composite printing disc assembly seeks to achieve the objective of providing a disc that can operate at high speeds and deliver a high quality of printing.

SUMMARY OF THE INVENTION

The invention is a plastic and metal composite assembly structured in a novel manner. The print disc hub with its radially extending arms is composed of a flexible plastic such as acetal homopolymer, acetal copolymer, or polypropylene. The printing characters are each composed of a thin layer of powdered metal or plated plastic zinc, which are fastened to the ends of the arms.

The aforementioned assembly is constructed by first making a disc or ring member containing a font of characters annularly arranged thereon. The disc of characters is made of powder metal or of plastic zinc. The character containing disc is machined to produce a double annular ring with individualized character segments disposed therebetween. Next, the inner ring of said double ring member is cut-off. A plastic disc hub with flexibly extending radial arms is injection molded of a flexible plastic such as acetal homopolymer, acetal copolymer, or polypropylene. The character segments are then placed upon the flexible arms and bonded thereto. To obtain a completed disc, the remaining annular ring is removed from the plastic-metal composite structure by a cutting operation.

It is an object of the invention to provide an improved printing disc;

It is another object of this invention to provide a novel compositely assembled printing disc, and a method of making same.

It is still a further object of the invention to provide a high speed printing disc providing a high quality of printing.

These and other objects of this invention will become more apparent and will be better understood with reference to the following detailed description taken in conjunction with the accompanying drawings, in which:

FIG. 1 is a partial top view of a powdered metal disc having a font of characters arranged annularly thereon;

FIG. 2a is an enlarged sectional view of FIG. 1 taken along lines 2—2;

FIG. 2b is the enlarged sectional view of FIG. 2a showing a machined cut therein;

FIG. 2c is the enlarged sectional view of FIG. 2b showing an additional machined cut therein;

FIG. 3 is an enlarged perspective view of the disc of FIG. 1 after the machined cut of FIG. 2b;

FIG. 4 is a partial top view of a plastic disc having a plurality of flexible arms extending radially therefrom;

Figure 6:
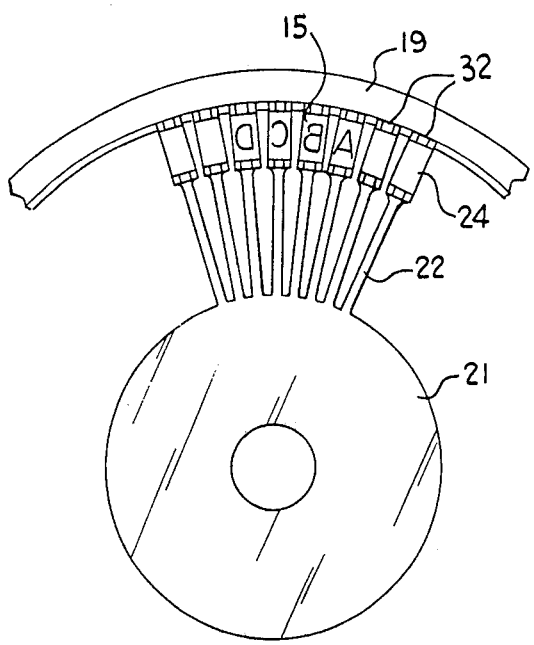
FIG. 6 is a partial top view of the assembled structural members of FIG. 5.

Now referring to FIG. 1, a powdered metal disc 10 is shown having a font of characters 9 annularly arranged about a peripheral portion thereof. The powdered metal disc is formed with two V-grooved slots 11 and 12, respectively, and with depressions 14 disposed between the characters 15. The depressions 14 between the characters 15 are grooved deeper into the metal of disc 10 than the V-grooves 11 and 12, as illustrated in FIG. 2a.

The disc 10 then has a section 16 machined from beneath the font of characters 9 (FIG. 2b) to provide the structural member shown in FIG. 3.

Because depressions 14 were deeper than grooves 11 and 12, (FIGS. 1 and 2a) the characters 15 have become individually separated from each other when section 16 is removed from disc 10 the characters 15 are now separated by channel 20 as illustrated in FIG. 3.

The removal of section 16 is accomplished by first partially machining the metal from under the font of characters, so that the full depth of section 16 is not reached. The remaining metal is then hardened. The rest of section 16 is removed by electrical discharge machining methods.

Figure 5:
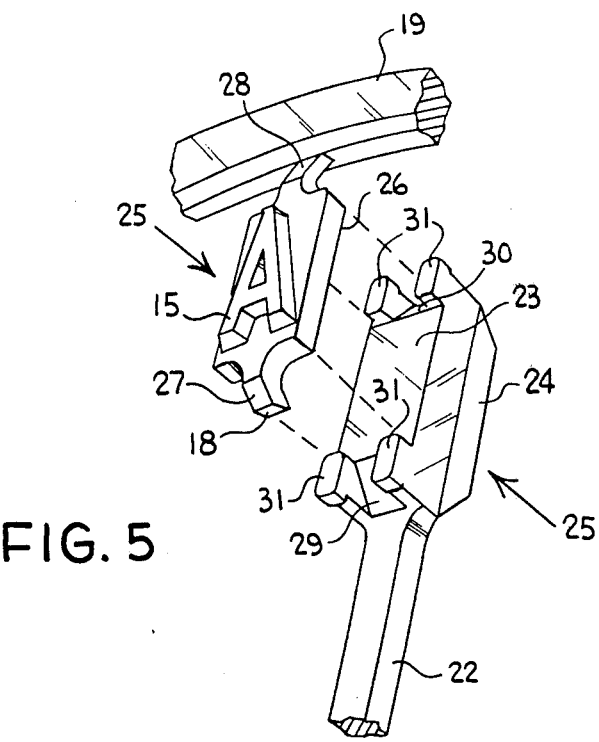
FIG. 5 is a partial enlarged perspective view of the proposed assembly of the structural members shown in FIGS. 2c and 4.

Next, the inner disc structure 17 is removed from the disc along surface 18, leaving the font of characters attached only to outer ring 19 as shown in FIG. 2c and as illustrated in the upper half of FIG. 5.

FIG. 4 depicts a molded disc 21 of flexible plastic. The disc 21 has a plurality of radially extending arms 22. The end portions 24 of the arms 22 have a molded face 23 for receiving the characters 15 attached to ring 19 (FIGS. 4 and 5).

FIG. 5 illustrates the joining (arrows 25) of a typical character 15 with a typical arm 22 about is end portion 24. Face 23 of end portion 24 acts as a seat for the back face 26 of character 15.

Tabs 27 and 28 of the character 15 nest within recesses 29 and 30, respectively, of portion 24.

The portion 24 has plastic toes 31, which are deformed over the respective tabs 27 and 28, by applying a heated forming tool thereto. This results in firmly achoring the tabs 27 and 28, and hence character 15, to said end portion 24 of arm 22 (see FIG. 7).

The resulting composite assembly of the joined structures 15 and 24 of FIG. 5, is illustrated in FIG. 6. The metal characters 15 are now each "molded-in" with a corresponding end portion 24.

The last machining step necessary to provide a completed printing disc, requires the removal of outer ring 19. This is accomplished by cutting ring 19 from surfaces 32 at the crown of the end portion 24 (see FIG. 7).

Figure 7:
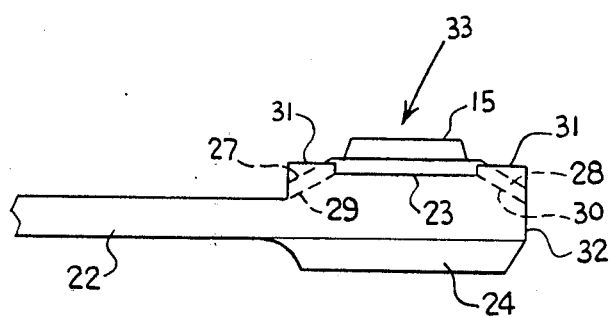
FIG. 7 is a partial side view of the assembly of FIG. 6 with the outer ring section removed.

FIG. 7 shows a typical character composite print head 33 with the character 15 firmly secured to face 23 of end portion 24 of arm 22. Note that ring 19 has been removed from surface 32.

The character disc or ring 10, can be manufactured according to powder metallurgical techniques or super plastic techniques as follows:

METHOD A - POWDER METALLURGICAL PROCESS

The character elements are produced by any suitable powder metal process (such as that shown in Standard R 3751 of Pitney-Bowes, Inc., Stamford, Connecticut) which includes the compression of metallic and nnon-shaped metallic powders, generally while confined in a die where a shape is formed and then bonded by heating (sintering) to produce structurally sound components. This process can accommodate a wide variety of materials, with high surface finishes and close tolerances. This will allow character elements, type, etc. produced by this method to have high precision and detail which will be compatible to post thermal treatments for increased surface and core properties or post coatings for increased surface properties. Post treatments will increase the performance of the character elements. Examples of materials which can be used are as follows:

A. O. Smith-Inland, Inc., Milwaukee, Wisconsin 46F2-50 Pre-Alloyed Powder

Chemical Analysis:

| | |
|---|---|
| Fe | Bal |
| Mn | .50% |
| P | .01% |
| S | .02% |
| Mo | .55% |
| C | .50% | or

Hoeganaes, Corp., Subsidiary of Interlake Inc., Riverton, New Jersey Ancorsteel 4650v Powder

| | |
|---|---|
| Fe | 96.9% |
| Ni | 1.8% |
| Mo | 0.5% |
| Mn | 0.20% |
| C | 0.50% |
| S | 0.018% |
| P | 0.01 |

Density: Any density that would allow for a soundly sintered compact could be utilized. We recommend a density of 7.0 gm/cc so that the interconnected porosity is kept at a minimum, while retaining good detail of the character.

Thermal Treatment: Any suitable thermal treatment or hardening process such as that found in Pitney Bowes Standard D 1122 of Pitney Bowes, Inc., Stamford, Connecticut.

This treatment or similar treatments will increase the core and surface hardness and mechanical properties. This treatment will prevent the characters from peening or failing in compression, i.e., exceeding the compressive yield.

Post Coating: Any suitable post coating for further increasing the wear resistance is used, such as a Pitney Bowes Standard D 1322 "Chromium Plate-Wear Resistant" surface. A "Borkote" surface which will do the same as above. Borkote is a boride diffusion coating marketed by Kennametal Inc., Latrobe, Pennsylvania. When processed on iron, it produces an iron boride Fe B which has a hardness greater than 1500 DPH units or greater than 75 Rockwell C. This coating is a diffusion coating into the original surfaces and, therefore, offers good thermal and mechanical shock resistance, and vibration and fatigue resistance.

METHOD B: SUPERPLASTIC PROCESS

The superplastic process utilizing a thermal compression forming technique is capable of producing character with clear details.

Material: Superplastic zinc alloys produced by New Jersey Zinc. Specific alloys: SPZ 200, SPZ 300, SPZ 400, or Other superplastic alloys such as brass type, stainless steel type, etc.

Post Coating: Any suitable coating is applied to increase the mechanical wear, such as a Pitney Bowes Standard D 1322 "Chromium Plate-Wear Resistant:.

The spirit and scope of the invention should not be limited to any obvious changes or modifications which would occur to those skilled in the art. The invention should be interpreted with respect to the following appended claims.

What is claimed is:

1. A plastic and metal printing disc assembly constructed of a composite of structural members, said printing disc assembly comprising:

a plastic disc shaped member having a hub portion which supports a plurality of flexible arms radially extending outwardly from said hub portion, an outer end of each of said arms having an end portion for receiving a type character member upon a flat face of each of said end portions, said end portions each having four corners, each of which contains a toe, each said face having two sloping recesses, each recess being disposed between two toes; and a plurality of metal type character members annularly arranged with respect to each other, and each having two oppositely extending tabs, each tab nesting within a sloping recess of a corresponding end portion, said toes of each end portion being formed over said tabs to provide composite individual type and arm structures, said metal type character members each having a coating to provide a wear resistant surface thereon.

\* \* \* \* \*